(12) United States Patent
Francis et al.

(10) Patent No.: US 6,440,044 B1
(45) Date of Patent: *Aug. 27, 2002

(54) RESISTANCE MECHANISM WITH SERIES CONNECTED RESISTANCE PACKS

(75) Inventors: Paul S. Francis; William N. Nelson; Teryl K. Rouse, all of Kansas City, MO (US)

(73) Assignee: SpiraFlex, Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,423

(22) Filed: Aug. 1, 2000

Related U.S. Application Data (63) Continuation-in-part of application No. 09/130,736, filed on Aug. 7, 1998, now Pat. No. 6,126,580.

(51) Int. Cl.⁷ .............................................. A63B 21/012
(52) U.S. Cl. ........................ 482/114; 482/116; 482/137
(58) Field of Search ................................ 482/114, 148, 482/72–119, 133–135, 137–140, 143, 144; 411/114, 116, 145, 125; 74/575, 578; 242/382

(56) References Cited

U.S. PATENT DOCUMENTS

| | | |
|---|---|---|
| 481,730 A | 8/1892 | Miller |
| 885,074 A | 4/1908 | Nidever |
| 913,799 A | 3/1909 | Zund-Burguet |
| 2,868,026 A | 7/1959 | Finehout et al. |
| 3,764,132 A | 10/1973 | Hepburn |
| 4,010,948 A | 3/1977 | Deluty |
| 4,114,875 A | 9/1978 | Deluty |
| 4,231,568 A | 11/1980 | Riley et al. |
| 4,511,137 A | 4/1985 | Jones |
| 4,944,511 A | 7/1990 | Francis |
| 5,209,461 A * | 5/1993 | Whightsil, Sr. |
| 6,126,580 A * | 10/2000 | Francis et al. .............. 482/114 |

* cited by examiner

Primary Examiner—Jerome W. Donnelly
Assistant Examiner—Lori Baker Amerson
(74) Attorney, Agent, or Firm—Shook, Hardy & Bacon L.L.P.

(57) ABSTRACT

A resistance mechanism suitable for applications such as resistance exercise equipment, cable reels, garage doors and other equipment requiring a resistive force. Resistance packs include circular rims and central hubs connected by deformable spokes. The packs are stacked in pairs with the rims in each pair pinned together and the hubs rotatable relative to one another. Each hub has a spline connection with the hub of the next resistance pack in the adjacent pair. This provides a series arrangement of the resistance packs which allows a long extension of the actuator with the spokes of each pack being deformed only slightly. A spiral pay out pulley for the cord assists in avoiding varying resistance with extension of the cord. The mechanism includes a preload system for applying a preload force to the resistance packs and a visual indicator for indicating the level of the preload force. An alternative construction involves forming the resistance packs in a single base having a pair of the resistance devices housed together. The devices may include arms connected by peripheral portions to provide loops that are looped around walls on the base to avoid a need for a bonded connection of the arms to the rims.

37 Claims, 7 Drawing Sheets

RESISTANCE MECHANISM WITH SERIES CONNECTED RESISTANCE PACKS

RELATED APPLICATIONS

This application is a continuation-in-part of application Ser. No. 09/130,736, filed by Francis et al. on Aug. 7, 1998 now U.S. Pat. No. 6,126,580 and entitled "Resistance Exercise Machine With Series Connected Resistance Packs"

FIELD OF THE INVENTION

This invention relates generally to equipment for applying resistive forces and more particularly to a specially constructed resistance pack and a resistance mechanism which provide resistance force individually and through series connected resistance packs in devices such as garage doors, cable reels, resistance exercise machines and other applications where a resilient resistive force is desired.

BACKGROUND OF THE INVENTION

Springs of various types, especially steel tension springs, are used in a wide variety of applications to provide a resistive force, including resistance exercise equipment, hose and cable reels, garage doors, overhead doors and other doors, door closers, tool balancers, automotive hood and trunk balancers, various types of office and medical equipment, crowd control barriers, and a wide variety of appliances, industrial equipment, and consumer products. Steel springs are commonly used to provide resistive forces in these applications, although other devices have been used. For example, resistance exercise machines have incorporated weights, deformable resistance elements, and friction or centrifugal mechanisms to provide a resistive force. Usually, resistance exercise machines take the form of large stationary equipment. Equipment that uses weights as the resistance is obviously heavy and unsuitable for uses where light weight is essential or where portability is important.

U.S. Pat. No. 4,944,511 to Francis discloses a portable exercise machine in which resistance is provided by a variable number of stacked spring packs. Each pack has a known resistance, and the resistance packs are connected together in a manner to provide an additive force. The stacked resistance packs all rotate together so that in applications where a long extension of the cord is required, the resistance packs rotate a significant amount. When the springs approach their limit of deformation, they provide significantly increased resistance. Thus, the resistance can increase sharply during the range of motion of equipment, particularly when the cord nears a fully extended position.

Resistance elements of the type shown in U.S. Pat. No. 5,209,461 to Whightsil can be incorporated in a light weight unit which nevertheless provides considerable resistance. Therefore, this type of resistance pack has characteristics making it suitable for use in exercise equipment and other applications where light weight and portability are important. However, achieving a flat resistance-extension curve with this type of resistance pack is still difficult, particularly if the requirements include providing a large resistance force and at the same time accommodating a long extension of the cord or other actuator.

In recent years, it has been discovered that personnel stationed in a micro-gravity environment, as on a space station, tend to lose muscle mass and bone density quickly because of the absence of gravity opposing their normal movements. It is important for such personnel to have resistance exercise equipment available to allow them to exercise regularly and counteract the tendency for muscular atrophy and loss of bone density. Heavy weights are obviously not a viable option for a micro-gravity application of this type. Compactness, light weight and portability are attributes that are necessary for exercise devices intended for use on space stations and similar environments. At the same time, a large resistance force is desirable so that the musculo-skeletal system of crew members can be loaded to provide the required counter measures.

The same considerations apply in connection with many other types of equipment that make use of resistive force.

SUMMARY OF THE INVENTION

The present invention is directed to a resistance mechanism which is characterized by light weight, portability, and versatility, such that individual resistance packs may be used alone or in combination to create a relatively constant or varying resistance force throughout its range of motion. It is the principal goal of the invention to provide a resistance mechanism which has these characteristics and which can be used in a wide variety of applications where a resistance force is required.

More particularly, it is an important object of the invention to provide a resistance mechanism in which the resistive force is obtained by connecting resistance packs together in a series arrangement. This feature allows the cord or other actuator element to be extended a considerable distance without the resistance force varying unduly throughout the operating range of the mechanism. Another object of the invention is to provide a resistance mechanism which achieves a substantially constant force with increased extension through the use of a pulley having a progressively increasing diameter around which the cord is wrapped in a spiral configuration. The cord is received in a spiral groove formed in the surface of the pulley, and the pulley diameter increases progressively from bottom to top. Thus, as the cord is extended, it applies a force to the pulley at an increasingly large diameter part of the pulley. As the resistance elements are increasingly deformed with increasing extension of the cord, their resistance increases somewhat. This increased resistance is essentially canceled by the increased moment arm that results from the rope acting on a larger diameter portion of the pulley as the rope is extended. Depending upon the application, the diameter of the pulley may vary, allowing the moment arm to also vary.

A further object to the invention is to provide a resistance mechanism in which the resistive force can be easily pre-set to any desired level throughout a large range of resistance.

An additional object of the invention is to provide a resistance mechanism which is constructed using resistance packs that are specially arranged to include two resistance elements each, with the arms of each elastomeric element formed as loops and looped around walls on the base of the pack. This construction is efficient and effective, inexpensive to manufacture, reliable in operation and compact.

In accordance with the invention, a resistance mechanism is constructed by connecting a selected number of resistance packs together in a series arrangement. Each resistance pack has a rim and a central hub connected to the rim or adjacent to the rim by elastomeric spokes or arms which stretch to resist turning of the rim relative to the hub. The resistance packs are arranged in pairs, which the rims in each pair connected with one another. The pairs of resistance packs are arranged in a stack centered on a shaft. Splined sleeves are mounted on the shaft and mate with splines on the hubs of the resistance packs. The hubs of each pack have spline connections with the hubs of resistance packs in adjacent pairs. However, the hubs of the packs in each pair are not connected and can turn relative to one another.

This series arrangement of the resistance packs is an important feature of the invention. When a force is applied to rotate the hub of one resistance pack, it is transmitted through the spokes to the rim, then to the rim of the other pack in the same pair, through its spokes to the hub, and through the spline connection to the hub of the pack in the adjacent pair. The force is transmitted in series in this way through all of the resistance packs, resulting in a relatively small and substantially equal deformation of the spokes in each pack. Consequently, as the actuator element is increasingly displaced, the spokes of all of the packs share the deformation, and the entire range of movement of the actuator is accommodated without any of the spokes reaching or approaching its deformation limit.

The rim or hub of the resistance pack on one end of the stack is held stationary. A spiral pulley having an increasing diameter from one end to the other may be secured to the rim or hub of the resistance pack on the opposite end of the stack. The actuator may take the form of a cord extending around the pulley in a spiral groove. This construction results in the cord acting against an increasingly larger diameter portion of the pulley as it is extended, thus counteracting the slightly increasing force that results from increasing deformation of the spokes as the cord is extended.

The resistance mechanism can be equipped with a preload mechanism which includes a gear secured to the resistance pack on the end of the stack opposite the pulley. A smaller gear operated by a hand crank can be turned to rotate the larger gear and thus apply an initial deformation to the stack which sets a preloaded resistance. A pawl mechanism acting on the gear system holds the gears in place in the preloaded setting. An indicator acting in cooperation with a force scale may provide a visual indication of the preload force.

An alternative construction of the resistance pack provides a single base which includes two resistance elements, one each on opposite sides of the base, taking the form of spiders each having a central hub and outwardly extending elastomeric spokes or arms that are looped around walls formed near the periphery of the base. This avoids the need to glue or otherwise physically fix the outer ends of the arms to the rim, and thus avoids the potential of detachment of the arms from the rim. This construction is also inexpensive and versatile in that a reduced number of parts and manufacturing steps are required, and resistance elements of different configurations can be used interchangeably on a single base.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

The invention will be described specifically as used in connection with resistance exercise equipment. However, it is to be understood that the resistance mechanism of the present invention is equally useful to provide a resistive force in a wide variety of other types of equipment and machinery.

Figures 1, 2, 3, 4:
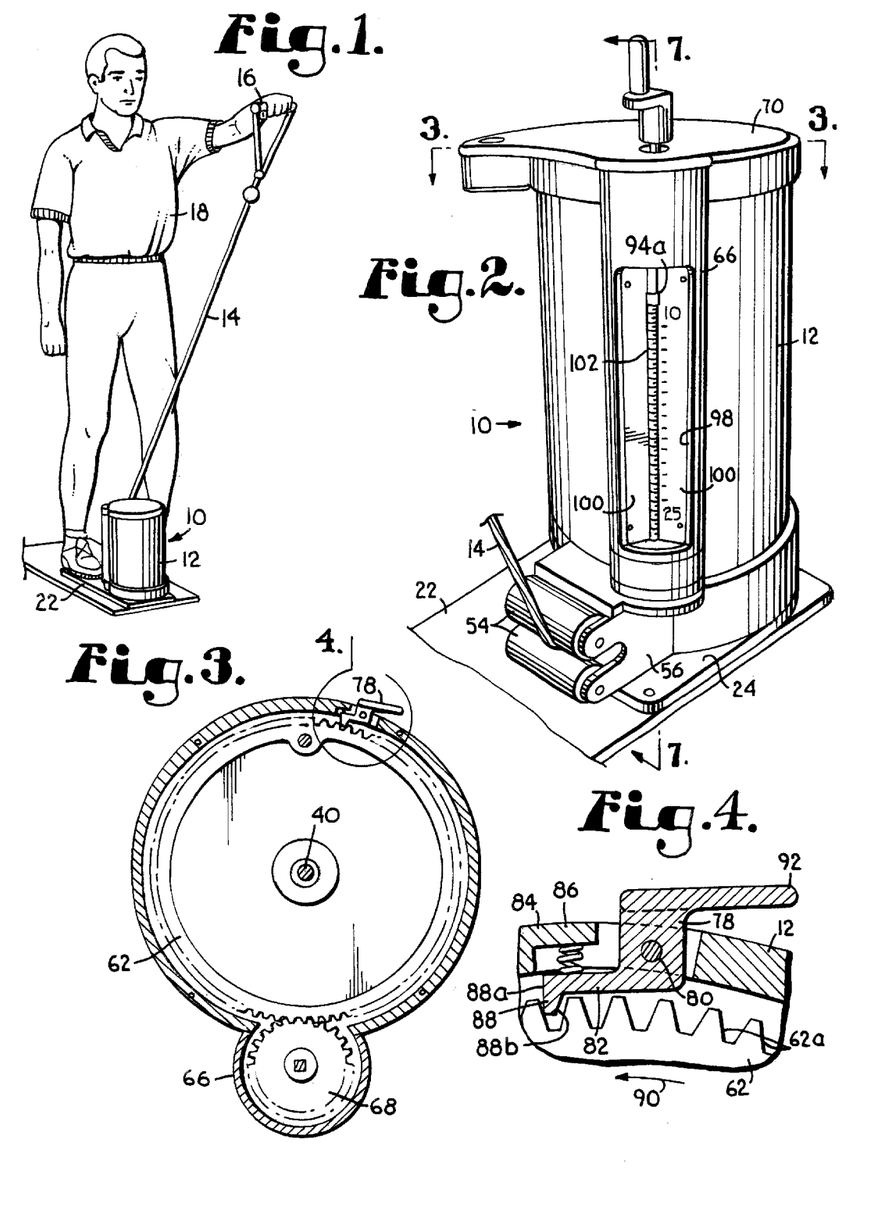
FIG. 1 is a perspective view showing use of a resistance mechanism incorporated in an exercise machine in accordance with one embodiment of the present invention.
FIG. 2 is a perspective view on an enlarged scale of the exercise machine shown in FIG. 1.
FIG. 3 is a sectional view taken generally along line 3—3 of FIG. 2 in the direction of the arrows.
FIG. 4 is a fragmentary enlarged view of detail 4 depicted in FIG. 3.

Referring now to the drawings in more detail and initially to FIG. 1, numeral 10 generally designates an exercise machine that is equipped with a resistance mechanism constructed according to one embodiment of the present invention. The exercise machine 10 includes a hollow housing 12 which is generally cylindrical and which contains a resistance mechanism that offers resistance to the extension of an actuator element such as a flexible cord 14. The end of the cord 14 is accessible from the exterior of the housing 12 and may be provided with a handle 16 which may be gripped by the hand of a user 18 of the machine. The handle 16 may be detachable from the cord by means of a snap hook (not shown) which allows other attachments (such as a squat bar, ankle cuff of squat harness) to be used.

While only housing 12 is shown in the drawings, it is to be understood that the machine can be provided with a pair of housings so that the user can exercise both arms or shoulders or both legs at the same time. Likewise, while the drawings show the cord 14 as the actuator element, other types of actuators can be used instead. Also, various types of attachments can be provided for the cord 14 (including a squat harness) which permit the user 18 to perform leg squats and other types of exercise simulating heavy weight work.

The cord 14 is equipped with a stop 20 which may be fixed to the cord near the handle 16. The stop 20 may be adjustable along the length of the cord and provided with a suitable mechanism (not shown) allowing it to be locked in place on the cord at the desired location thereon.

The housing 12 is mounted on a flat floor plate 22 which, as best shown in FIG. 1, may extend beyond the housing 12 to provide a surface for receiving the feet of the user 18. The floor plate 22 may be suitably secured to the floor or other surface on which the machine is used. As best shown in FIG. 2, a base plate 24 is mounted on the floor plate and covers the bottom of the housing 12.

Figures 5, 6, 7:
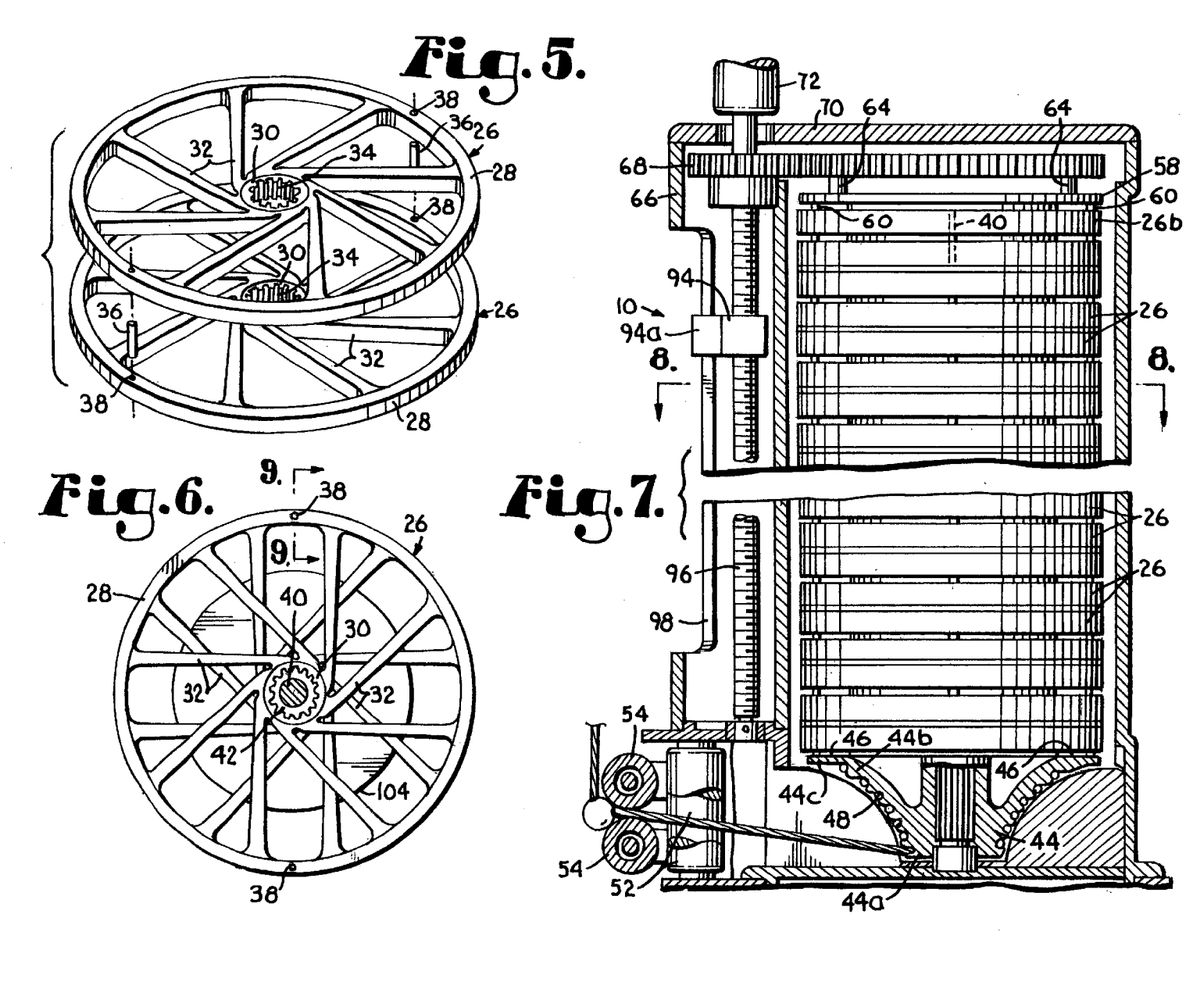
FIG. 5 is an exploded perspective view showing a pair of the resistance packs which are included in the resistance mechanism in accordance with the invention.
FIG. 6 is a plan view of one of the resistance packs.
FIG. 7 is a fragmentary sectional view taken generally along line 7—7 of FIG. 2 in the direction of the arrows, with the break lines indicating continuous length and the end portion of the actuating cord broken away.

A resistance mechanism which is located within the housing 12 includes a plurality of resistance packs which are each generally identified by numeral 26 and best shown in FIGS. 5 and 6. Each resistance pack 26 has a rigid circular rim 28 and a central hub. Extending generally radially between the hub 30 and rim 28 of each resistance pack 26 are a plurality of elastomeric spokes 32. The spokes 32 are connected at their outer ends with the inside surface of the rim 28 and are connected tangentially to the outer surface of the hub 30. Each spoke 32 may taper gradually from its outer end towards its inner end. The hubs 30 are circular members concentric with the rims 28.

Each hub 30 has an annular shape and is provided with splines 34 on its inside diameter.

This construction of the resistance packs 26 provides them with a wheel type construction and allows each rim 28 to rotate relative to the hub 30, which such relative rotation resulting in tension and deformation of each spoke 32. The elastomeric construction of the spokes causes them to resist deformation in this manner and provides a resistance force which opposes relative rotation between the rims 28 and hubs 30. The construction of the spokes 32 results in the resistance force being generally constant so long as the relative rotation between the rims 28 and hubs 30 remains small enough that the deformation limit of the spokes is not approached. The rims 28 and hubs 30 are preferably constructed of a light weight metal such as aluminum, although other materials can be used.

The construction of each resistance pack 28 is substantially the same as disclosed in U.S. Pat. No. 5,209,461 to Whightsil which is incorporated by reference and to which reference may be made for a more detailed description of the resistance pack construction.

The resistance packs 26 are arranged in pairs which are located adjacent to one another. With reference to FIG. 5 in particular, the resistance packs 26 in each pair are connected at their rims by pins 36 or in another suitable manner. Each rim 28 may be provided with a pair of small passages 38 at diametrically opposed locations. The pins 36 may be fitted in the passages 38 of each pair of rims 28 in order to secure the rims of each pair of resistance packs 26 together. The hubs 30 of the resistance packs 26 in each pair are not connected and remain free rotate relative to one another. The resistance packs 26 may be arranged within housing 12 in a stack of the type best shown in FIG. 7. A vertical shaft 40 is mounted to extend vertically through the center of the housing 12 and through the hubs 30. The resistance packs 26 are stacked in pairs located generally on top of one another and are centered on the shaft 40 which provides a rotational axis for the resistance mechanism. It should be noted that the stack of resistance packs need not be a vertical stack and could extend horizontally or in some other orientation.

Figure 8:
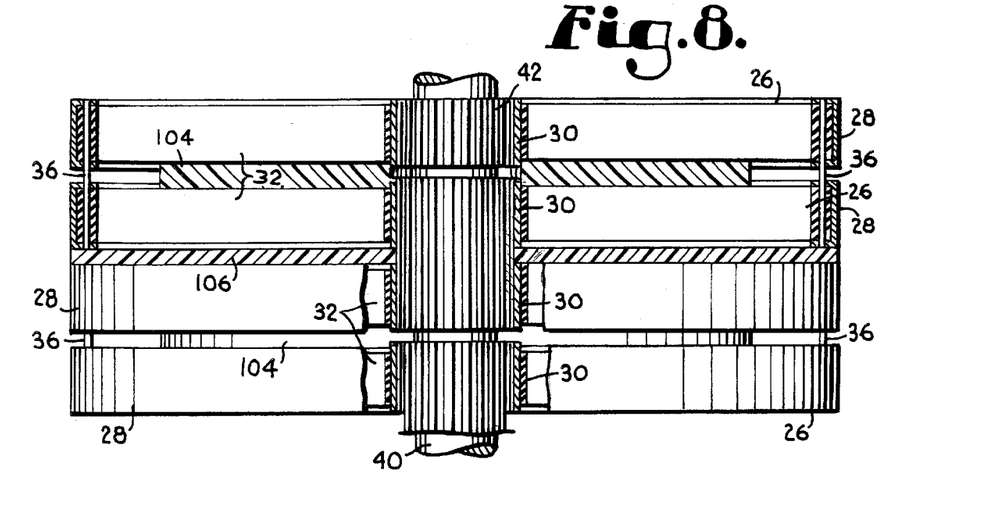
FIG. 8 is a fragmentary sectional view on an enlarged scale showing how adjacent pairs of the resistance packs are connected in the resistance mechanisms.
Figure 9:
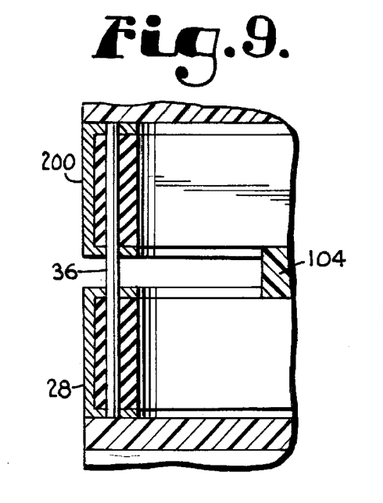
FIG. 9 is a fragmentary sectional view on an enlarged scale taken generally along line 9—9 of FIG. 6 in the direction of the arrows.

The hubs 30 of the resistance packs in the adjacent pairs are connected together in a spline arrangement which is best shown in FIG. 8. The top two resistance packs 26 shown in FIG. 8 form one pair thereof, while the lower two resistance packs 26 provide another pair. As previously indicated, the packs in each of the pairs have their rims 28 connected together by means of the pins 36. A plurality of splined sleeves 42 are provided for connecting the hubs of the resistance packs to adjacent hubs in different pairs. As shown in FIG. 8, the lower resistance pack 26 in the upper pair thereof has its hub 30 connected by one of the splined sleeves 42 with the hub 30 of the upper resistance pack 26 in the lower pair of resistance packs. The sleeves 42 have exterior splines which mate with the hubs spline 34. The sleeves 42 are fitted on the shaft 40 and can turn about it.

In this manner, the hub of each resistance pack in each pair of resistance packs is connected with the adjacent hub of the resistance pack in the adjacent pair of resistance packs. Thus, the resistance packs in each pair are connected together at the rim and are connected with the adjacent resistance pack in another pair thereof at the hub.

The stack of resistance packs 26 is mounted on top of a payout pulley 44 which is mounted to turn about the lower end of the shaft 40. With particular reference to FIG. 7, the pulley 44 has a special configuration which is generally frusto-conical and which includes a relatively small diameter lower end 44a and a larger diameter upper end 44b. The pulley 44 generally increases progressively in diameter from the lower end 44a toward the upper end 44b. The stack of resistance packs includes a bottom resistance pack 26a located on the bottom of the stack and not paired with another resistance pack (although it does have a hub connection with the adjacent pack. The top end of the pulley 44 is provided with a flange 44c which is connected with the rim 28 of resistance pack 26a by pins 46 or another type of fastening means.

A continuous spiral groove 48 is formed in the outer surface pulley 44. The groove 48 begins near the lower end 44a of the pulley and ends adjacent to its upper end 44b. The groove 48 spirals around the pulley from its lower end to its upper end, and, due to the pulley configuration, extends around increasingly larger diameter portions of the pulley from the lower end 44a toward the upper end 44b.

Figure 10:
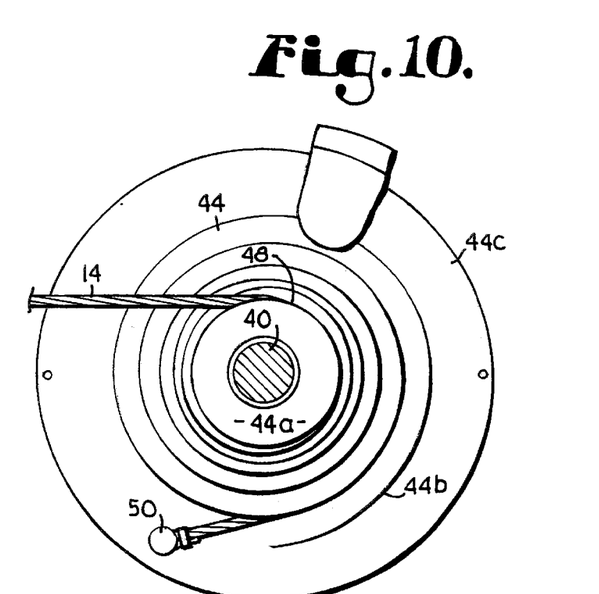
FIG. 10 is a bottom plan view of the payout pulley included in the resistance mechanism in accordance with the invention.

One end of the cord 12 is secured to the underside of the pulley flange 44c by a suitable fastener 50 (see FIG. 10). The cord extends from the fastener 50 and is wound around pulley 44 in the groove 48, from which the cord exits at the lower end 44a of the pulley (see FIG. 7). With continued reference to FIG. 7, the cord extends closely between a pair of vertically oriented rollers 52 which are mounted to the housing of the machine for rotation and then closely between a pair of horizontal rollers 54. As shown in FIG. 2, the horizontal rollers 54 are mounted between a pair of bracket plates 56 for rotation. The stop 20 (FIG. 1) is too large to fit between the rollers 54, so the handle 16 on the end of the cord 14 remains outside of the housing at an accessible location.

The resistance mechanism is equipped with a preload mechanism which allows an initial preload resistance to be set as desired. With reference to FIG. 7 in particular, the stack of resistance packs 26 has an upper end pack 26b which is not paired with another resistance pack (although it has a hub connection with the adjacent pack). A disk 58 overlies resistance pack 26b and is pinned at 60 to the rim 28 of resistance pack 26b. A large gear 62 is in turn connected with disk 50 by pins 64 or other suitable fastening means. A small housing 66 contains within its upper portion a small gear 68 which mates with gear 62. Housing 66 may be attached to one side of the main housing 12. A cover panel 70 covers the top of both housings 12 and 66 and immediately overlies the gears 62 and 68. Gear 68 may be turned by a crank which includes a vertical post 72 connected with the center of gear 68. A laterally extending crank arm 74 (FIG. 2) extends from the top end of post 72. A crank handle 76 extends upwardly from the outer end of the crank arm 74. Manual turning of the crank by gripping the handle 76 rotates gear 68 which mates with and thus turns gear 62.

The large gear 62 is held in its preloaded setting by a pawl mechanism which is best shown in FIG. 4. A pawl 78 is mounted to pivot about a vertical pin 80 secured to the upper rim of the housing 12 at a location generally diametrically opposed to the location of the housing 66. The pawl 78 includes an arm 82 which is urged toward the teeth of gear 62 by a compression spring 84 which also acts against a bracket 86. A tip portion 88 formed on the end of the pawl arm 82 is engaged between the teeth 62a of gear 62 and is urged to fit between the teeth by the spring 84. The tip 88 has a generally square face 88a which acts against the adjacent tooth 62a to prevent gear 62 from turning in a direction opposite the direction indicated by the arrow 90 in FIG. 4. The tip 88 has on its opposite side a beveled surface 88b which allows the gear 62 to rotate in the direction indicated by arrow 90, with the teeth 62a camming against surface 88b to displace the tip 88 from a locking position between the teeth 62a.

Thus, the crank can be used to turn gear 68 and effect the rotation of gear 62 in the direction of the arrow 90, and the pawl 78 locks the gears against rotation in the opposite direction. In this manner, gear 62 can be rotated to effect rotation of the resistance packs 26 in order to initially deform the spokes to provide an initial resistance that preloads the stack of resistance packs to a selected preloaded resistance force. The pawl 78 has a release lever 92 which can be pressed inwardly with the hand in order to release the tip 88 from its normal position between the gear teeth 62a, thus releasing gear 62 for rotation under the influence of the resistance packs to an undeformed condition.

The preload force setting is visually indicated by an indicator 94 which moves upwardly and downwardly within housing 66 along a threaded vertical shaft 96. The shaft 96 is mounted to turn within housing 66 and is secured at its top end to the gear 68 so that shaft 96 turns with rotation of gear 68. The indicator 94 has a threaded connection with shaft 96 so that it moves upwardly and downwardly as the shaft is rotated.

As best shown in FIG. 2, the housing 66 has a cutout or window 98. A pair of graduated scales 100 are secured within housing 66 adjacent to the window 98 and have their inner edges spaced apart to provide a vertical slot 102. The scales 100 are provided with graduation marks (not shown) adjacent to the slot 102 which correspond to the force (in pounds or other suitable units) set by the preload mechanism. The indicator 94 has a projecting tip 94a which extends through the slot 102 and which aligns with a graduation mark corresponding to the force of the preload setting. The fit of the tip 94a closely in the slot 102 prevents the indicator 94 from rotating on the shaft 96.

In order to prevent the spokes 32 from deflecting upwardly or downwardly when they are deformed, each pair of the resistance packs 26 may be provided with a separator disc 104 (see FIGS. 6–8). The discs 104 are closely fitted between the resistance packs 26 in each pair and are small enough in diameter that they terminate inwardly of the connecting pins 36 for the rims 28. Preferably, the discs 104 fit on their inside diameters between the ends of adjacent sleeves 42 to protect against wear on the sleeves. Larger separator discs 106 are provided between the adjacent pairs of resistance packs 26. The discs 106 fit around sleeves 42 on their inside diameters and may terminate at their outside diameters adjacent to the peripheries of the resistance packs. Discs 106 similarly fit closely between the resistance packs to prevent the spokes 32 from bulging upwardly or downwardly when they are deformed.

In use, the exercise machine 10 can be preloaded to the desired force level by turning the crank manually using the crank handle 76. The cord 14 at this time is fully retracted such that the stop 20 engages roller 54 as shown in FIG. 7. When gear 62 is turned, it turns the rim of the top resistance pack 26b, and the force is transmitted through the spokes 32 of pack 26b to its hub 30. Its hub 30 has a spline connection with the hub 30 in the top resistance pack 26 of the adjacent pair, thus transmitting the force between the hubs and then through the spokes 32 of the second resistance pack to its rim 28. The force is transmitted to the rim 28 of the other resistance pack in the first pair thereof, and through its spokes 32 to its hub 30. The force continues transmission through the stack of resistant packs in this manner, between hubs of the resistance packs in adjacent pairs through the splined connection and then through the spokes 32 to the rims which are pinned together in each pair. The result is that each of the resistance packs 26 in the stack is deformed slightly until the preload force level is reached, as indicated by the alignment of the projecting tip 94a with the graduation mark on scale 100 corresponding to the desired force level.

The handle 16 can then be gripped, and the user 18 can pull on the cord 14 in order to extend it. As the cord extends, it pays out of the spiral groove 48 and turns pulley 44 which in turn rotates the lower most resistance pack 26a. Because resistance pack 26a has a spline connection with the hub of the adjacent resistance pack 26, that hub is rotated and transmits the displacement force through the spokes 32 to the rim and then to the next rim due to the pinned connection. The force is transmitted through the entire stack of resistance packs 26 in this manner so that each of the rims 26 is rotated slightly relative to its hub 32.

The series connection of the resistance packs 26 allows the cord 14 to be extended a considerable distance while deflecting each of the spokes 32 to only a relatively small degree. The deflection force is additive in that the total force is equal to the force provided by the deformation of the spokes 32 of each flex pack. Because the spokes 32 are deflected only a small distance, they do not approach their deformation limit, and the resistance force remains relatively constant throughout the entire range of extension of the cord 14.

The force-extension curve is maintained in an even flatter condition due to the presence of the pulley 44. As the cord 14 is increasingly extended, the spokes 32 are increasingly stretched, and the resistance increases slightly with increased tensile deformation. This effect is counteracted because as the cord 14 is extended, it unwinds from the spiral groove 48 and acts against increasingly larger diameter areas of the pulley 44. Consequently, the moment arm (distance of the engagement between the cord 14 and pulley 44 from the axis of shaft 40) progressively increases as the cord is progressively extended, and the increased moment arm substantially counteracts the increased resistance encountered by increasing deformation of the spokes 32. By properly shaping the pulley 44 and providing the proper pitch of the spiral groove 48, the resistance-extension graph can be made to be essentially flat throughout the majority of the range of extension of the cord 14.

After the cord 14 has been fully extended, the user 18 slowly releases it so that it returns to the initial position with the stop 20 against the rollers 54. It is noted that the return stroke offers resistance, and this is known to be beneficial to the exercise process.

Figures 11, 12:
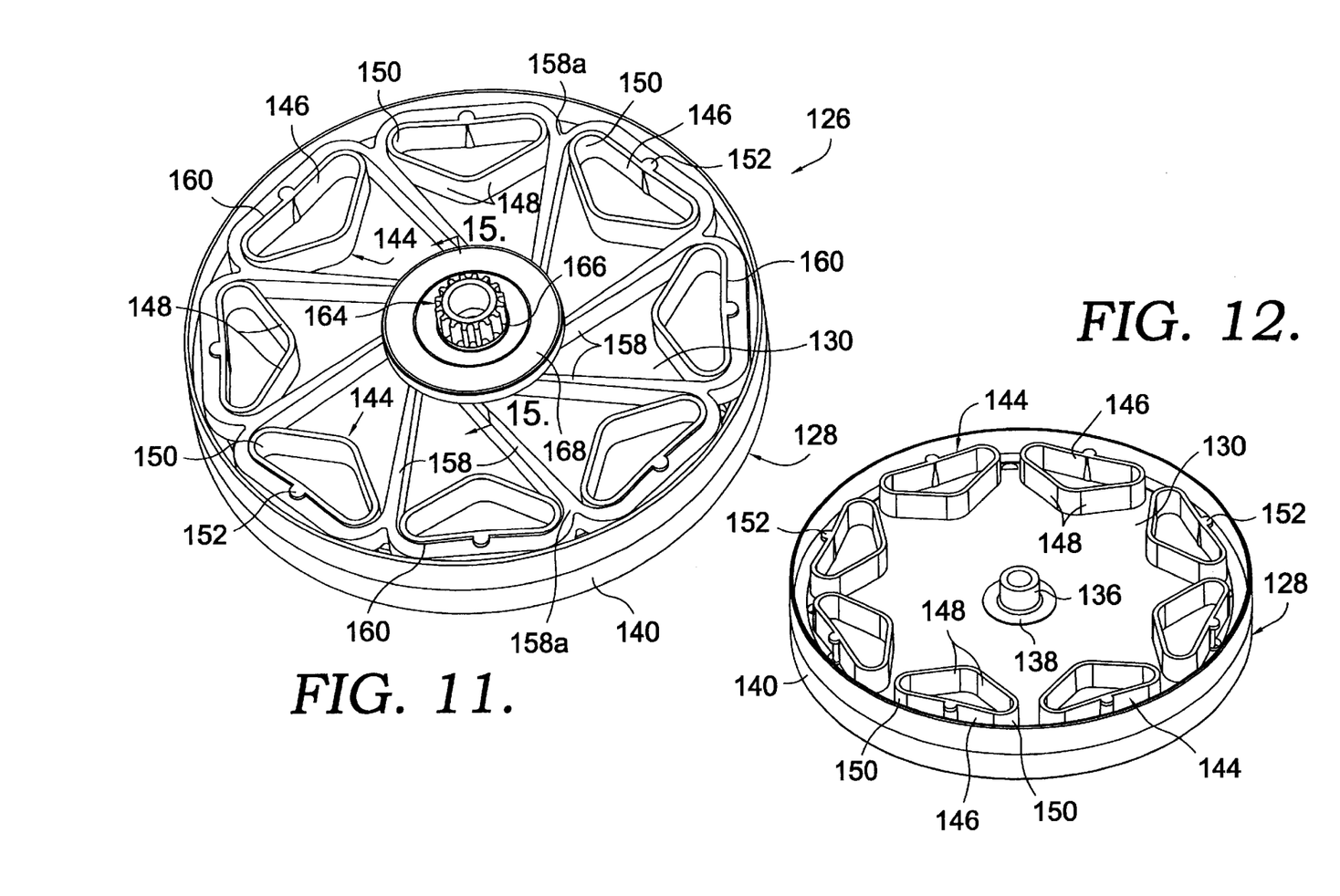
FIG. 11 is a perspective view of a resistance pack constructed according to an alternative embodiment of the invention.
FIG. 12 is a perspective view of the resistance pack shown in FIG. 11 with the resistance element removed.

FIGS. 11–14 illustrate an alternative construction of a resistance pack which is generally identified by numeral 126 in FIG. 11. The resistance pack 126 may be used in the manner described in connection with resistance packs 26 and may be coupled together with additional resistance packs 126 in a resistance exercise machine or in another type of application involving the need for a resistance force.

Figures 13, 14, 15:
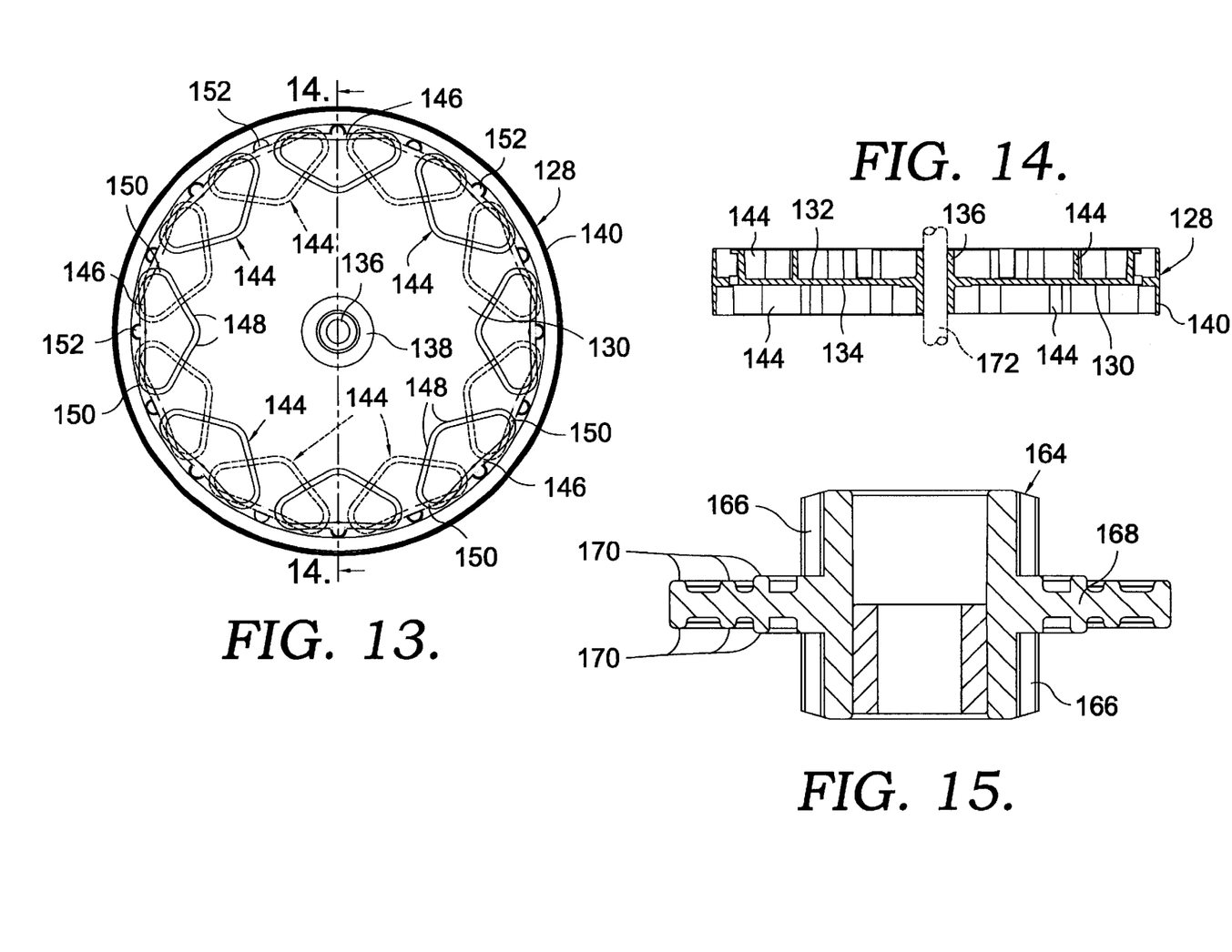
FIG. 13 is a plan view of the resistance pack base shown in FIG. 12, with the broken lines depicting the staggered locations of the triangular wall structures on opposite sides of the base panel.
FIG. 14 is a sectional view taken generally along line 14—14 of FIG. 13 in the direction of the arrows.
FIG. 15 is a sectional view on an enlarged scale taken generally along line 15—15 of FIG. 11 in the direction of the arrows showing the splined sleeve used with the resistance pack of FIG. 11.

The resistance pack 126 has a base which is generally identified by numeral 128 and which is preferably constructed of a rigid plastic or other suitable material. The base 128 includes a discoidal base panel 130 having flat opposite sides 132 and 134 (see FIG. 14). The base panel 130 has a center provided with a bushing 136 projecting from each of the surfaces 132 and 134. Each surface 132 and 134 is provided with a raised annular ledge 138 extending around the bushing 136. A circular rim 140 is provided on the circular periphery of the base panel 130. The rim 140 projects from each of the surfaces 132 and 134. As best shown in FIG. 14, each surface 132 and 134 is provided with a raised annular ledge 132 located adjacent to the rim 140.

The base panel 130 is provided with a plurality of rigid triangular frames 144 which project from each of the sides 132 and 134. Each frame 144 is located adjacent to but spaced slightly inwardly from the rim 140 on the periphery of panel 130. Each frame 144 includes an outer wall 146 and a pair of connecting walls 148 which connect with each other and with the opposite ends of the outer wall 146. Curved connections 150 are formed at the intersections between walls 146 and 148. All of the walls 146 and 148 are rigid and are connected with the base panel 130, preferably as an integrally molded part of the panel.

Preferably, each of the sides 132 and 134 of the base panel 130 is provided with eight of the frames 144 which are spaced equidistantly apart around the peripheral region of the base panel. However, a different number can be employed. Each of the walls 146 is oriented substantially perpendicular to a radial line extending from the center of the panel 130 to the peripheral rim 140. The connecting walls 148 serve essentially as braces to reinforce and rigidify the outer wall 146. A small tab 152 projects from the outer edge of each wall 146 substantially at the center thereof and terminates at a location spaced a short distance from the adjacent edge of the rim 140.

Figure 16:
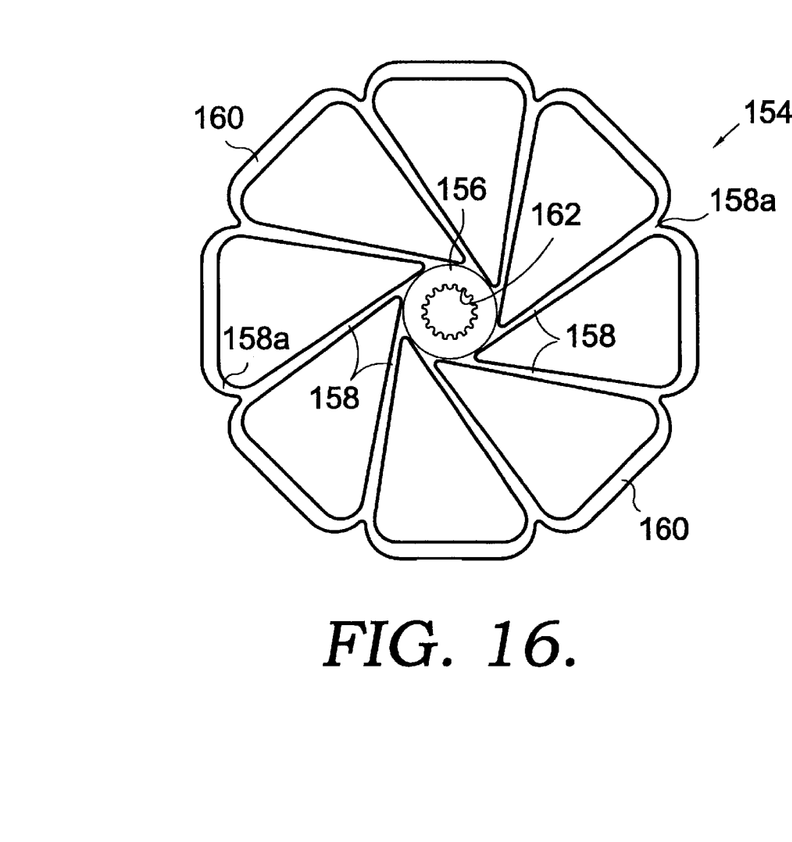
FIG. 16 is a plan view of the resistance element used in the resistance pack of FIG. 11.

Each of the resistance packs 126 is provided with a pair of spider shaped resistance elements 154 which may be constructed of a suitable elastomeric substance exhibiting resiliency and resistance to stretching. As best shown in FIG. 16, each of the resistance elements 154 includes a circular hub 156 at its center and a plurality of spokes or arms 158 extending outwardly from the hub 156. A plurality of peripheral portions 160 of the resistance elements 154 extend between the outer ends 158a of the arms 158.

The arms 158 and peripheral portions 160 are preferably molded together as integral parts of the resistance element 154. The hub 156 may be constructed of a rigid plastic material which is molded with the remainder of the resistance element 164 and glued or otherwise bonded to the elastomeric inner end portions of the arms 158. The hub 156 is hollow and is provided with internal splines 162. The arms 158 are generally but not exactly radial. Each arm 158 is substantially tangent to the circumference of the hub 156. In the embodiment shown in FIG. 16, there are eight arms 158 which are spaced equidistantly apart around the circumference of the hub 156. There are eight of the peripheral portions 160, each extending between the outer ends 158a of adjacent arms. In this embodiment, each arm 158 has a pair of the peripheral portions 160 extending generally in opposite directions from its outer end 158a. The base 128 of each resistance pack 126 receives two of the resistance elements 154, with one resistance element being installed against each of the opposite sides 132 and 134 of the base panel 130. The resistance element 154 is installed with its hub 156 fitting over the central bushing 136 and with the peripheral portions 160 being installed beneath the tabs 152 in extension along the outer surfaces of the outer walls 146 of the frames 144. The arms 158 extend between the adjacent frames 144 in the manner shown in FIG. 11.

As best shown in FIG. 13, the frames 144 on each side of the base panel 130 are staggered relative to the frames 144 on the other side of the base panel. This results in the forces that are applied to the frame 144 being uniformly distributed throughout the resistance pack 126. In most applications, the resistance elements 154 located on opposite sides of the base panel 130 are oriented oppositely to one another. For example, within the resistance pack 126 shown in FIG. 11, the element 154 adjacent to side 132 is oriented such that its arms 158 are skewed from a radial position such that their outer ends are in a more counterclockwise direction than if the arms were oriented radially. The resistance element 154 that is adjacent to the opposite side 134 (this second resistance element is not shown in FIG. 11) is oriented with its arms 158 skewed from a radial position such that the outer ends of the arms are in a more clockwise position than if they were oriented exactly radially.

This reverse orientation of the two resistant elements in each resistance pack 126 allows the packs to be connected together in a series relationship as described previously in connection with the embodiment of FIGS. 1–10. However, in some applications, it may be desirable to provide a parallel connection pattern, in which case the resistance elements 154 in each resistance pack are oriented with their arms coinciding or overlying one another.

In most applications, the resistance packs 126 will be stacked together with additional resistance packs, and the hubs 156 of the resistance elements 154 in adjacent resistance packs are then connected together by splined sleeves such as the sleeve 164. Each sleeve 164 is hollow and fits closely around the bushing 136, as shown in FIG. 15. The exterior of the sleeve 164 is splined as indicated at 166 in order to mate with the internal splines 162 of the resistance elements 154. The center of sleeve 164 is provided with an outwardly projecting flange 168 which is a flat annular member provided with ribs 170 on its top and bottom surfaces.

The splined sleeve 164 is used to connect the hubs 156 of the resistance elements 154 in adjacent resistance packs 126 which may be arranged in a stack in the manner previously described in connection with the embodiment of FIGS. 1–10. The splines 166 on opposite sides of the flange 168 mate with the splines 162 of the two adjacent hubs 156. A shaft 172 (see FIG. 14) extends through the center of all of the hubs 136 to provide a rotational axis for the stack of resistance packs.

The resistance packs 126 can be stacked and used in a series arrangement in substantially the same manner previously described in connection with the embodiment of FIGS. 1–10. When the hub 156 of each resistance element is rotated relative to the rim 140 of the resistance pack containing the resistance element, the arms 158 and peripheral portions 160 of the resistance element are stretched, and the resilient construction of the resistance element resists stretching of the arms and peripheral portions to provide a resistive force that opposes the stretching of the arms and peripheral portions. As viewed in FIG. 16, the hub 156 is rotated in a clockwise direction to effect stretching of the arms and resistance elements 158.

When the resistance element is deformed, the peripheral portions 160 are stretched and slide along the walls 146. The arms 158 also stretch and are tapered inwardly, with the outer end portions 158a of the arms being wider than the inner end portions that connect with the hub 156. By providing the peripheral portions 160 to connect the outer ends of adjacent arms 158, each pair of arms and the corresponding resistance elements 160 provide a looped configuration which is looped around the corresponding frame 144. The result is that the peripheral portions 160 provide additional length that can stretch in order to provide for more stretching of the resistance element 154 as a whole. Consequently, the resistance element 154 can be deformed to a greater extent before reaching its deformation limit than would be the case with a resistance element lacking the peripheral portions 160, thus providing resistance over a wider degree of rotation.

In addition, the looping of the resistance element segments around the frames 144 eliminates the need to glue or otherwise bond or connect the outer ends of the arms 158 physically with the peripheral rim portion of the base 128. Due to the significant forces that are applied to the resistance element when it is deformed, bonded connections can detach and thus result in a catastrophic failure of the entire resistance element. This problem is eliminated by the construction of the present invention due to the looping of the resistance elements around the frames 144 rather than gluing or otherwise physically fixing them to the rim of the base.

Figure 17:
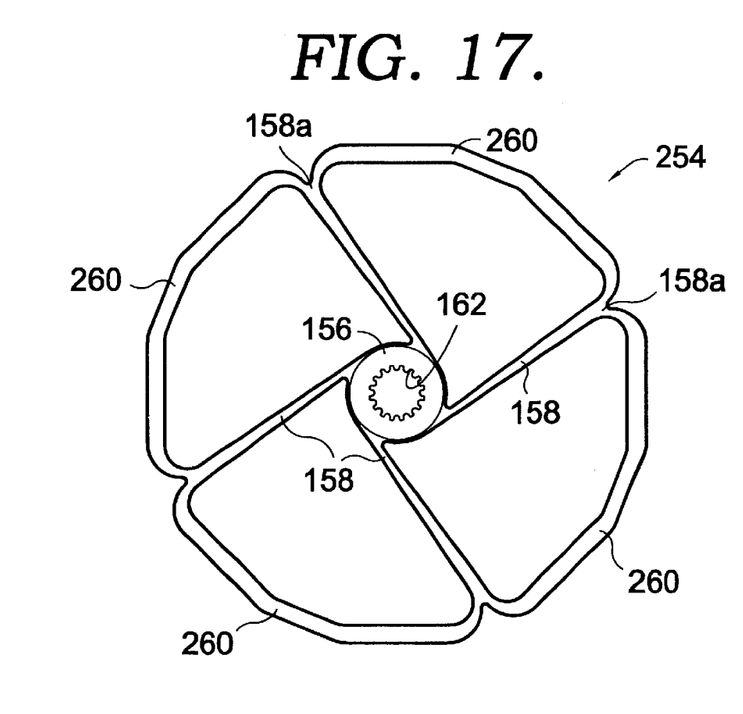
FIG. 17 is a plan view of an alternative resistance element that can be used in the resistance pack base.

The raised ledge 138 at the center of the base panel 130 and the raised ledge 142 at the periphery of panel 130 result in the arms 158 being raised slightly above the surface of panel 130. Consequently, as the arms 158 are repeatedly stretched and unstretched during operation of the resistance pack, the arms do not rub on the surface of panel 130, and the wear on the arms and panel is reduced accordingly. Similarly, the hubs 156 rotate against the ribs 170 of the flange 168 rather than against the flange as a whole. This reduces the wear on the hub 156 and flange 168. FIG. 17 illustrates a resistance element which can be used in the resistance pack 126 as an alternative to resistance element 154. Element 254 has the same hub 156 and internal spline 162 as element 154 but has only four of the arms 158 rather than eight arms. The four arms 158 are spaced equidistantly around the hub 156. Comparatively long peripheral portions 260 extend between the outer ends 158a of adjacent arms in the embodiment of FIG. 17. Each arm 158 has two of the peripheral portions 260 which extend generally in opposite directions from the outer end 158a of the arm. The loops provided by adjacent arms 158 and the connecting peripheral portion 260 are looped around two adjacent frames 144 when the resistance element 254 is installed on the base 128.

Figure 18:
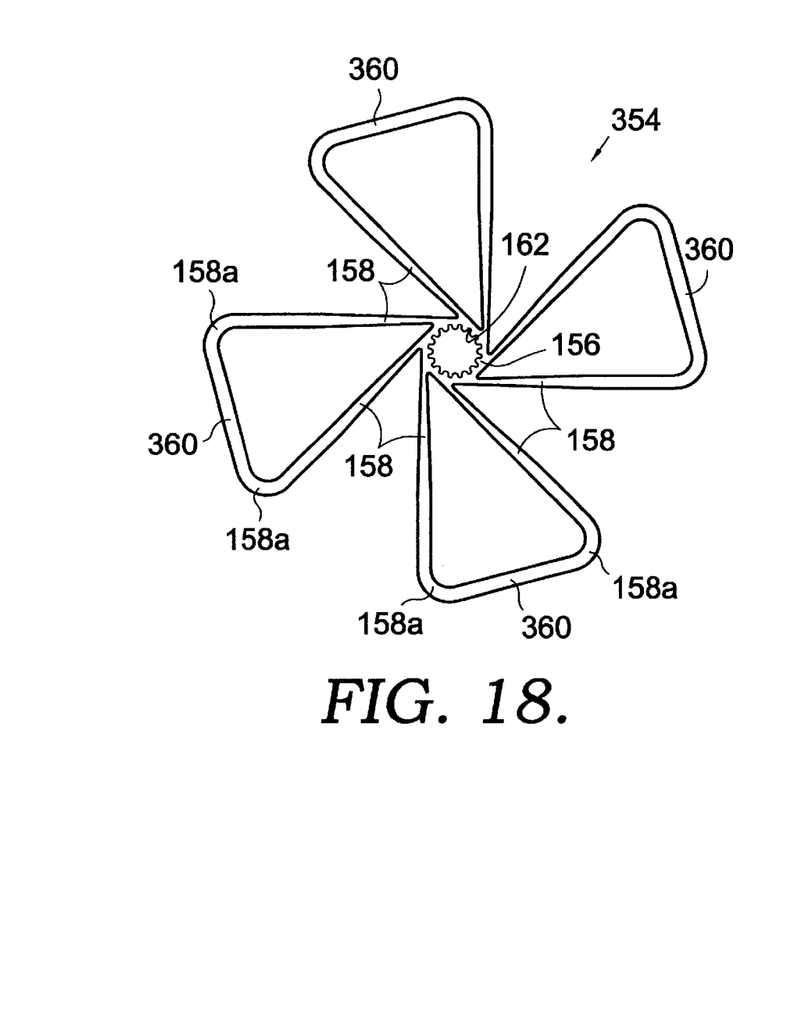
FIG. 18 is a plan view of another alternative resistance element that can be used in the resistance pack base.

FIG. 18 depicts another alternative resistance element 354 which may have the same hub 156 and internal splines 162 as the other resistance elements. Eight arms 158 extend outwardly from the hub 156 and are spaced equidistantly apart. The outer ends of adjacent arms 158 are connected by peripheral portions 360. The difference between the resistance element 354 and element 154 is that each arm 158 has only one peripheral portion 360 extending from it. As a result, there are only four peripheral portions 360 in element 354 rather than the eight peripheral portions 160 included in element 154. When the element 354 is installed on base 128, the loops formed by the pairs of arms 158 and the connecting peripheral portions 360 are looped around frames 144, with only four of the frames being used on each side of the base panel 130.

Figure 19:
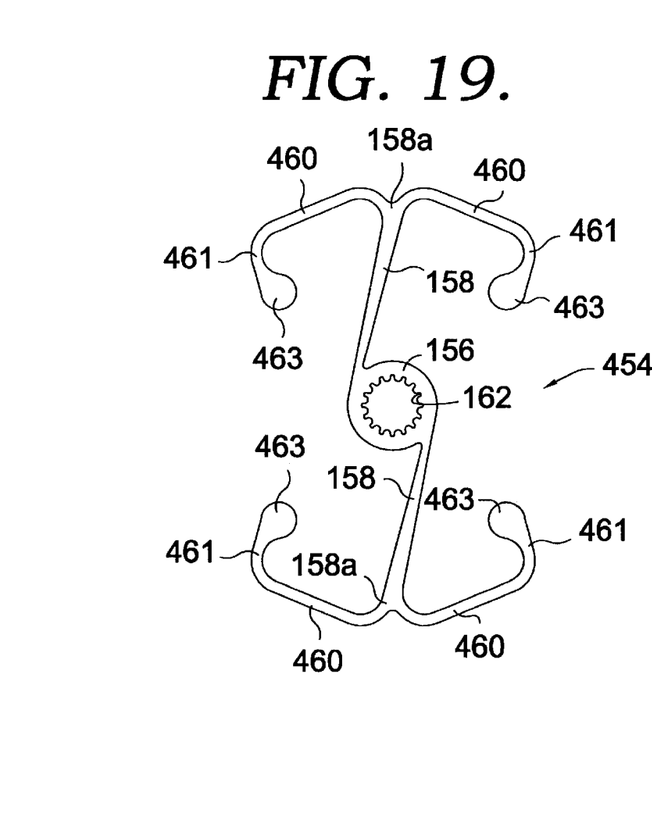
FIG. 19 is a plan view of still another resistance that can be used in the resistance pack base.

FIG. 19 depicts another alternative resistance element 454 which may have a hub 156 and internal splines 162 similar or identical to the other elements. The element 454 has only two arms 158 which extend in opposite directions from the hub 156. A pair of peripheral portions 460 extend in opposite directions from the outer end 158a of each arm 158. Each peripheral portion 460 has an in turned end leg 461 which is provided on its free end with an enlarged bead 463. Each arm 158 and the peripheral portions 460 and legs 461 provide loops that are looped around the frames 144 when the resistance element 454 is installed in base 128. There are only four looped structures provided so that only four of the frames 144 are used. The end legs 461 are extended between the spaces formed between adjacent frames 144. The end beads 463 serve as holding devices that retain the looped structures around the frames 144 because the beads 463 are too large to pass between the spaces between adjacent frames 144. Consequently, when the hub 156 is rotated relative to the rim of the resistance pack, the arms 158, peripheral portions 462 and end legs 461 are stretched because the beads 463 fix the ends of the loop structures relative to the frames 144.

Each of the resistance packs 126 essentially takes the place of two of the resistance packs 26 of the type described in connection with the embodiment of FIGS. 1–10. Compared to pinning two of the resistance packs 26 together at their rim areas, the resistance pack 126 has advantages in that the outer ends of the resistance elements 126 installed on base 128 are secured together because the base 128 is formed as a unitary member capable of receiving two different resistance elements on opposite sides of the base panel 130.

The resistance element shown in FIGS. 16–19 can be used interchangeably in the same base 128, depending upon the nature of the resistive force that is desired for the particular application in which the resistance pack 126 is to be used. Although the resistance elements are shown as having either eight, four or two spokes or arms, a resistance element can be constructed with a different number of arms. However, for replaceability and interchangeability purposes, the resistance elements shown in FIGS. 16–19 are preferred. Any one of them can be removed and replaced with an identical element or a different element using the same base 128, thus enhancing the versatility and operating life of each resistance pack 126.

While the resistance pack 126 and the resistance elements shown in FIGS. 16–19, as well as the embodiment shown in FIGS. 1–10, are applicable in resistance exercise equipment, they are also useful in a variety of other applications that have long been dominated by the mechanical storage of power through the use of springs, particularly steel springs. Compared to steel springs, the resistance packs 26 and 126 are advantageous in a number of respects, including higher force, less weight, better corrosion resistance and a longer operating life. With respect to the power to weight ratio in mass applications, the present invention provides approximately three times more resistance force per pound of weight than a steel spring. With respect to cost, the present invention is approximately one-half as expensive as a steel spring, considering that substantial labor is required to wind, assemble, grease and seal mechanical spring assemblies. Because the present invention can be constructed using plastic and rubber components rather than steel, it is not subject to corrosion. Even if a steel spring is packed in grease and sealed inside of an airtight container (which is a labor intensive and costly process), the seal can deteriorate over time and admit moisture and air that can corrode the steel. As to operating life, steel springs that are used in reels under standard loading conditions are typically rated at 250,000 cycles. The resistance mechanism of the present invention has been tested and continues to operate effectively and reliably after 1,000,000 cycles.

Another advantage is that the resistive force can be varied in the present invention by adding or subtracting resistance packs. This is beneficial compared to the conventional practices in the steel spring industries that involve the requirement to provide a large number of different springs each having a different force.

For all of these reasons, the resistance mechanism of the present invention has significant advantages not only in the resistance exercise field but also with respect to virtually any application that involves the need to provide a resistive force.

The resistance mechanism of the present invention is particularly well suited for equipment in which light weight, portability, compactness and long life cycle are important. At the same time, the flat force-extension curve achieved by the resistance mechanism makes it useful in a wide variety of applications, including professional and consumer markets, as well as in other applications which require resistance, including applications where springs have been commonly used to provide a resistance force. Such applications include hose and cable reels, garage doors, overhead doors, door closers, tool balancers, automotive hood and trunk balancers, office equipment, medical equipment, industrial and commercial equipment, crowd control barriers, and other types of products such as consumer products that are sold through mass marketing channels.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. Resistance apparatus comprising:
   a base panel having a periphery and a center;
   a plurality of projections each presenting a wall extending from said panel at a location between said center and periphery;
   a resistance element having a hub adjacent to the center of said panel and a plurality of resilient arms extending outwardly from said hub and having portions extending along said walls and slidable thereon, said arms deforming when said hub turns relative to said periphery and resisting deformation thereof to provide a resistance force opposing turning of said hub relative to said periphery; and
   a hub connection connected with said hub to effect rotation of the hub relative to said periphery.

2. Resistance apparatus as set forth in claim 1, wherein each wall has a surface along which said arm portions extend and which extends generally transverse to a line between said center and periphery.

3. Resistance apparatus as set forth in claim 2, wherein said arm portions extend between outer ends of adjacent arms of said resistance element.

4. Resistance apparatus as set forth in claim 3, wherein each arm has a pair of said arm portions extending therefrom in generally opposite directions.

5. Resistance apparatus as set forth in claim 2, wherein each arm portion has a free end secured between adjacent walls.

6. Resistance apparatus as set forth in claim 5, wherein:
   said arms are two and only two in number;
   said arms each has two of said arm portions extending therefrom in generally opposite directions; and
   said arms extend outwardly from said hub in generally opposite directions.

7. Resistance apparatus as set forth in claim 2, wherein each projection has a generally triangular shape and includes second and third walls extending from said panel and connected with each other and the first mentioned wall.

8. Resistance apparatus as set forth in claim 1, including a raised ledge surface on said base panel adjacent to said periphery on which said arm portions move when deformed and a raised ledge surface on said base panel adjacent to said center on which said hub bears.

9. Resistance apparatus as set forth in claim 1, including a retaining element projecting from each wall to retain said arm portions against said walls.

10. Resistance apparatus comprising:
    a discoidal base panel having a center and a substantially circular periphery;
    a plurality of spaced apart walls extending from said base panel adjacent the periphery thereof;
    a resistance element having a hub adjacent to the center of the panel and a plurality of resilient arms extending outwardly from said hub, said resistance element including a plurality of peripheral portions connected with outer ends of said arms to form loops looped around said walls with said peripheral portions bearing against said walls; and
    a hub connection connected with said hub and operable to rotate the hub relative to said periphery to stretch said arms and peripheral portions of the resistance element, said arms and peripheral portions resisting stretching thereof to provide a resistance force opposing rotation of said hub relative to said periphery.

11. Resistance apparatus as set forth in claim 10, wherein each peripheral portion of said resistance element extends between outer ends of adjacent arms.

12. Resistance apparatus as set forth in claim 11, wherein each arm has a pair of said peripheral portions extending from the outer end thereof in generally opposite directions.

13. Resistance apparatus as set forth in claim 11, wherein:
    said arms are eight and only eight in number and are spaced substantially equidistantly apart; and
    each arm has a pair of said peripheral portions extending from the outer end thereof in generally opposite directions.

14. Resistance apparatus as set forth in claim 10, wherein:
said arms are eight and only eight in number and are spaced substantially equidistantly apart;
said peripheral portions are four and only four in number; and
each peripheral portion extends between outer ends of adjacent arms.

15. Resistance apparatus as set forth in claim 10, wherein:
said arms are four and only four in number and are spaced substantially equidistantly apart; and
each arm has a pair of said peripheral portions extending from the outer end thereof in generally opposite directions.

16. A resistance pack comprising:
a base panel having a periphery and a center and substantially flat opposite sides;
a pair of resistance elements disposed on said opposite sides of the base panel, each resistance element having a central hub adjacent to the center of said panel and a plurality of arms extending outwardly from said hub and having outer end portions adjacent to said periphery to effect stretching of said arms when said hubs are rotated relative to said panel; and
a hub connection for each hub operable to effect relative rotation between said hub and periphery, said arms resisting stretching thereof to provide a resistance force.

17. A resistance pack as set forth in claim 16, including a rim on said periphery projecting from both of said sides of said base panel.

18. A resistance pack as set forth in claim 16, including:
a plurality of walls extending from each side of said panel adjacent to the periphery thereof; and
a plurality of peripheral portions of each resistance element extending between the outer end portions of adjacent arms to form loops therewith looped around said walls.

19. A resistance pack as set forth in claim 18, wherein the walls on each side are staggered relative to the walls on the other side.

20. A resistance device for applying a resilient resistive force, comprising:
a hub;
a plurality of resilient arms extending outwardly from said hub and having outer end portions; and
a plurality of peripheral portions each extending between the outer end portions of adjacent arms to form with the arms a plurality of loops adapted to be looped around frames, said arms and peripheral portions being stretched when said hub is rotated relative to said frames and the arms and peripheral portions resist stretching to provide a resistive force opposing such relative rotation.

21. A resistance device as set forth in claim 20, wherein each arm has a pair of said peripheral portions extending from the outer end thereof in generally opposite directions.

22. A resistance device as set forth in claim 20, wherein:
said arms are eight and only eight in number and are spaced substantially equidistantly apart; and
each arm has a pair of said peripheral portions extending from the outer end thereof in generally opposite directions.

23. A resistance device as set forth in claim 20, wherein:
said arms are eight and only eight in number and are spaced substantially equidistantly apart; and
said peripheral portions are four and only four in number, each arm being connected at the outer end thereof with only one of said peripheral portions.

24. A resistance device as set forth in claim 20, wherein:
said arms are four and only four in number and are spaced substantially equidistantly apart; and
each arm has a pair of said peripheral portions extending from the outer end thereof in generally opposite directions.

25. A resistance mechanism for applying a resilient resistive force, comprising:
a plurality of resistance packs arranged in a stack which includes a plurality of pairs of resistance packs, each resistance pack having a substantially circular rim and a central hub connected with said rim by a plurality of resistance elements acting to resist turning of the rim of each resistance pack relative to the hub thereof;
a rim connection connecting the rims of the resistance packs in each pair thereof, the hubs of the resistance packs in each pair being rotatable relative to one another;
a hub connection connecting the hub of one resistance pack in each pair thereof with the hub of one resistance pack in each adjacent pair of resistance packs, the rims of the resistance packs in different pairs which are adjacent being rotatable relative to one another; and
an actuator element coupled with a selected one of said resistance packs, said actuator element being arranged for displacement thereof in a manner to effect relative rotation between the rims and hubs of the resistance packs, with said resistance elements resisting such relative rotation to provide a resistive force opposing displacement of said resistance element.

26. A resistance mechanism as set forth in claim 25, wherein said actuator element comprises a flexible cord adapted to be pulled to effect said relative rotation between the rims and hubs of the resistance packs.

27. A resistance mechanism as set forth in claim 26, including a pulley coupled with said selected one resistance pack and having a groove receiving said cord.

28. A resistance mechanism as set forth in claim 27, wherein:
said pulley has a shape presenting an increasing diameter from one end portion of the pulley toward another end portion, thereof;
said groove is arranged in a spiral pattern extending between said one end portion and said other end portion of the pulley; and
said pulley is oriented to effect application of force thereto in increasing diameter portions of the groove upon increasing extension of said cord and increasing deformation of said resistance elements.

29. A resistance mechanism as set forth in claim 28, including a preload mechanism permitting the rims and hubs of the resistance packs to be initially rotated relative to one another to a selected preload setting to provide an adjustable preload resistance to pulling of the cord.

30. A resistance mechanism as set forth in claim 25, including a preload mechanism permitting the rims and hubs of the resistance packs to be initially rotated relative to one another to a selected preload setting to provide an adjustable preload resistance to displacement of said actuator element.

31. A resistance mechanism as set forth in claim 30, including an indicator providing a visual indication of the magnitude of said preload resistance.

32. A resistance mechanism as set forth in claim 30, wherein said preload mechanism comprises:

a first gear coupled with one of said resistance packs and having a selected diameter;

a second gear rotating with said first gear and having a diameter smaller than said selected diameter; and a crank operable to turn said second gear to effect rotation of said second gear.

33. A resistance mechanism as set forth in claim 32, including a pawl arranged to lock said first gear against rotation in one direction while permitting rotation thereof in the opposite direction.

34. A resistance mechanism as set forth in claim 25, wherein said resistance elements comprise deformable spokes each resiliently resisting deformation thereof.

35. A resistance mechanism as set forth in claim 25, wherein said hub connection comprises a spline connection between each hub and each hub adjacent thereto of a resistance pack of another pair thereof.

36. Resistance apparatus for applying a resilient resistive force, comprising:

a rotatable resistance mechanism having an undeformed condition, said mechanism being rotatable about an axis from said undeformed condition and resisting deformation to exhibit a resistance force opposing rotation about said axis;

a pulley connected with said resistance mechanism to transfer rotation thereto upon rotation of the pulley, said pulley having a spiral groove which extends from a small diameter portion of the pulley to a large diameter portion thereof; and a flexible cord adapted to be pulled, said cord extending in said spiral groove and applying a force on the pulley at increasingly larger diameter portions thereof as the cord is pulled and extended such that said cord applies forces to increasingly larger diameter portions of the pulley as said mechanism is increasingly rotated about said axis by increased extension of said cord.

37. A machine as set forth in claim 36, wherein said resistance mechanism comprises:

a plurality of pairs of resistance packs arranged adjacent to one another and centered on a shaft providing a rotational axis, each resistance pack having a substantially circular rim and a central hub connected with the rim by a plurality of deformable spoke elements which deform upon relative rotation between the rim and hub to resist such relative rotation increasingly with increased deformation of the spoke elements;

first and second end resistance packs, said first end pack having its rim or hub fixed against rotation about said axis and said second end pack having its rim or hub coupled with said pulley for rotation thereby when the cord is extended;

a rim connection connecting the rims of the resistance packs in each pair thereof for rotation together about said axis, said hubs of the resistance packs in each pair thereof being rotatable about said shaft relative to one another; and a hub connection connecting each hub for rotation about said axis with the adjacent hub of a resistance pack of a different pair thereof.

\* \* \* \* \*